United States Patent Office 3,348,963
Patented Oct. 24, 1967

3,348,963
METHOD OF PRODUCING GAS-PERMEABLE ELASTIC POLYURETHANE FILMS
Osamu Fukushima, Kazuo Noda, and Tamon Kishida, Kurashiki, Japan, assignors to Kurashiki Rayon Co., Ltd., Kurashiki, Japan
No Drawing. Filed Oct. 13, 1965, Ser. No. 495,682
Claims priority, application Japan, Nov. 14, 1964, 39/64,455
7 Claims. (Cl. 117—63)

The present invention relates to a method of producing elastic polyurethane films by wet coagulation from a solution of polymer consisting essentially of polyurethane elastomer, characterized in that an alcohol having long-chain alkyl group containing from 8 to 30 carbon atoms, preferably from 14 to 20 carbon atoms is added to said solution, in an amount of from 0.1 to 20% based on the amount of said polyurethane.

The object of the invention is to provide films which have a very large number of continuous fine bubbles or pores formed in the course of wet coagulation, whereby subsequent washing for removal of solvent is facilitated, glutination and hardening of polyurethane elastomer on drying are prevented, and the film or coating layer so formed is smooth on the surface and has improved wear resistance and good gas- and moisture-permeability.

It has been well known that elastic films can be produced by wet coagulation from a polyurethane elastomer solution. For example, a solution of polyurethane is coated on woven fabrics and subjected to wet coagulation to obtain an elastic sheet-like materials, which are used for substitutes for leather and other applications.

Because of the glutinating tendency of polyurethane elastomer, however, the bubbles or pores formed by wet coagulation tend to become independent of one another with the result that the films thus formed generally have only limited moisture permeability and very little gas permeability. These represent the major disadvantages of cloths, shoes, etc. coated with such ordinary materials.

We found that, in the manufacture of a film or coating from a solution of polymer consisting essentially of polyurethane elastomer, numerous fine bubbles or pores can be formed continuously in the course of coagulation by wet method, by adding to a solution of the polymer an alcohol which has long-chain alkyl group containing from 8 to 30 carbon atoms, or preferably from 14 to 20 carbon atoms, in an amount of from 0.1 to 20% based on the amount of polyurethane, and that the formation of such continuous bubbles facilitates subsequent washing of the product for removal of solvent, prevents glutination and hardening of the polyurethane elastomer upon drying, smoothens the film or coating formed therefrom, and improves the surface wear resistance, gas- and moisture-permeability of the film thus produced.

Useful long-chain alcohols for the purpose of the invention are highly hydrophobic ones containing from 8 to 30 carbon atoms in the alkyl group. The alcohols having less carbon atoms than the above range are not effective because of insufficient hydrophobic property. Those which contain more than 30 carbon atoms are not adequately soluble in solvents and are poor in the effect of the invention. For these reasons, maximum benefits are obtained from alcohols having from 14 to 20 carbon atoms. Alcohols containing from 8 to 30 carbon atoms which are desirable for use in the invention include octyl alcohol, nonyl alcohol, decyl alcohol, dodecyl alcohol, tetradecyl alcohol, cetyl alcohol, stearyl alcohol, ceyl alcohol, myricyl alcohol, etc. A mixture of two or more than two kinds of alcohols may also be used.

Polyurethane elastomer to be used in the invention is composed of (1) a polyglycol having hydroxyl groups in both terminals and a mean molecular weight of from 500 to 5000, (2) an organic polyisocyanate containing not less than two isocyanate groups in the molecule, and (3) a polyfunctional extender such as diamine or diol.

As the polyglycol defined in (1) above, a polyester, polyether, polyether ester, polyacetal, polyoxysilane, or the like is useful. Particularly suitable polyesters are those obtained by condensation polymerization of an aliphatic dicarboxylic acid such as adipic acid, sebacic acid, or maleic acid with an aliphatic glycol such as ethylene glycol or hexamethylene glycol, or those having hydroxyl groups in both terminals which are obtained by reacting a lactone such as ε-caprolactone or β-caprolactone which contains at least two carbon atoms in the ring, or a mixture of such lactones, with a bifunctional extender such as ethylene glycol. Desirable polyethers are polyalkylene glycols such as polyethylene glycol, propylpropylene glycol, and polybutylene glycol. Polyether esters prepared by copolymerization of a cyclic lactone such as caprolactone and a cyclic ether such as propylene oxide, or by polycondensation of diethylene glycol with adipic acid or the like are also useful. It is further possible to use a mixture of more than two polyhydroxy compounds.

As the organic polyisocyanate defined in (2) above, an aromatic diisocyanate such naphthylene diisocyanate, p,p'-benzidine diisocyanate, p,p'-diphenylmethane diisocyanate, phenylene diisocyanate, 2,4- or 2,6-trilene diisocyanate, durene diisocyanate, 3,3'- or 5,5'-tetramethyl diphenylmethane-4,4'-diisocyanate, or the like is suitable. An aliphatic diisocyanate such as hexamethylene diisocyanate may be used as well. If necessary, it is also possible to employ a polyisocyanate having more than three isocyanate groups.

As the polyfunctional extender as defined in (3) above, a compound having at least two active hydrogen groups in the molecule, for example an aromatic diamine such as p,p'-methylene dianiline, diaminodurene, or 4,4'-diamino-3,3', 5,5'-tetramethyl diphenylmethane, or an aliphatic diamine such as hydrazine, ethylene diamine, propylenediamine, hexamethylenediamine, piperadine, or 2,5-dimethylpiperadine, or an aliphatic glycol such as ethylene glycol or propylene glycol, or a diol extender such as diphenylol alkane represented by bisphenol A, is preferable. Water, aminoalcohols such as ethanolamine, and polyamines and polyols containing necessary amount of functional groups more than three, may also be used.

It is further possible to prepare a film-forming solution by dissolving or dispersing a polyurethane elastomer above described together with such additives as a high-molecular weight compound such as polyvinyl chloride, polyacrylonitrile, polymethyl methacrylate, polyvinyl alcohol derivative, polyvinyl acetate, cellulose acetate, or fine powder of cellulose, a pigment such as carbon black or titanium oxide, or a large variety of dyes.

As solvent for the polyurethane elastomer, use may be made of dimethyl formamide, dimethyl sulfoxide, dimethyl acetamide, tetrahydrofuran, dioxane, etc. or a mixed solvent containing mainly these solvents.

As coagulation bath for the above solution water, methanol, isopropanol, toluene and other substances which do not dissolve polyurethane but is miscible with the solvents for polyurethane are useful. A mixture of these non-solvents, e.g. methanol-water, or a mixed solution which comprises a non-solvent and a solvent for the polymer to such an extent that the polyurethane is not dissolved, e.g. a dimethyl formamide-water solution, or dimethyl sulfoxide-isopropanol mixed solution, may be employed. After coagulation with steam etc. the resultant product may be washed for removal of the solvent.

In order to obtain an even and smooth film layer, it is desirable to dry the product after the coagulation and washing off the solvent from polyurethane. In this connection, it must be noted that, aside from the great washing effect derivable from the porous structure which is a feature of the invention, the permissible range of solvent content prior to drying is very large. By way of illustration, it is pointed out that when a film layer formed by wet coagulation from a solution of polyurethane elastomer in dimethyl formamide (DMF) which is free from said long-chain alkyl alcohol is dried, unless the DMF concentration, when impregnating the film, is kept below 2%, the porous structure of polyurethane is glutinated and hardened altogether to lose the smoothness on heat drying. By contrast, a film formed by wet coagulation from the solution of polyurethane elastomer in DMF of the same composition as above but with the addition of the alkyl alcohol as herein defined in an amount of 3% based on the total amount of polyurethane, is such that even when the DMF concentration during impregnation is between 10 and 25%, it undergoes no structural change in the process of drying and gives an even and smooth film layer.

While it is a distinctive feature of the invention that the period of washing for removal of solvent is shortened in the foregoing manner, the fact that the film or coating layer obtained upon drying in accordance with the invention has very good gas permeability and moisture permeability provides for more advantages when sheetlike materials using the film or coating according to the invention are formed into cloths, shoes, etc. than the benefits derivable from conventional polyurethane films or sheets.

The method of the invention and the properties of the product obtained by the invention are illustrated by the following examples.

*Example 1*

In a 25% solution of a polyurethane elastomer in dimethyl formamide composed of polyethylene propylene adipate of a mean molecular weight of 2000 having hydroxyl groups in both terminals (molar ratio of ethylene units and propylene units, 9:1), diphenylmethane diisocyanate, and ethylene glycol (molar ratio, 1:5:4), was added and dissolved stearyl alcohol in an amount of 3% based on the weight of polyurethane. The solution was applied on a flat smooth plate to a thickness of about 1 mm., or in amount of from 800 to 1000 g./m.². The coat was allowed to coagulate with a 50% aqueous solution of DMF at a temperature from 30 to 32° C., over a period of 15 minutes, and washed with water at a temperature from 20 to 30° C. for 30 minutes and then with warm water at a temperature from 60 to 70° C. for 1 hour, and after drying with hot air at 80° C. to obtain an elastic polyurethane film. Properties of the product are shown in Table 1, together with those of controls, i.e. a film (1) prepared in the same manner from a polyurethane solution of the same composition but without stearyl alcohol, and a specimen (2) prepared in the same manner as control (1) but with a washing period being 10 hours after coagulation into a solid coated film.

TABLE 1

| Test specimen | Weight (g./m.²) | Thickness (mm.) | Apparent Sp. Gra. | Gas permeability [1] (time) | Moisture permeability [2] (g./m.²/24 hrs.) | Smoothness |
| --- | --- | --- | --- | --- | --- | --- |
| Of invention | 230 | 0.54 | 0.51 | 10–20 sec | 6,930 | Good. |
| Control (1) | 233 | 0.31 | 0.75 | Over 2 hrs | 460 | Glutinated and hardness. |
| Control (2) | 236 | 0.59 | 0.40 | ----do---- | 1,120 | Became uneven. |

[1] In conformity with the Japanese Industrial Standards P-8117—1963.
[2] In conformity with Japanese Industrial Standards Z-0208.

*Example 2*

To a dimethyl sulfoxide solution containing 20% of a polyurethane elastomer composed of polybutylene adipate of a mean molecular weight of 1000 having hydroxyl groups in both terminals, diphenylmethane diisocyanate, and 1,4-butane diol (molar ratio, 1:2.5:1.5) and 5% of polyvinyl chloride, cetyl alcohol was added in an amount of 2% based on the weight of the polyurethane to form a coating solution. Meanwhile, unwoven cloth was impregnated with the polyurethane solution and, after wet coagulation, a leather-like material from 1.0 to 1.1 mm. in thickness, was obtained. The coating solution prepared above was applied evenly on the leather-like surface, in an amount of from 800 to 1000 g./m.², allowed to coagulate with 30% of an aqueous solution of dimethyl sulfoxide over a period of 10 minutes at a temperature from 30 to 32° C., washed with water at a temperature from 0 to 30° C. for 30 minutes, and then with warm water at a temperature from 60 to 70° C. for 2 hours, and then dried with hot air at 80° C. The sheet coated in this way had good surface smoothness, gas permeability, and moisture permeability, and was leather-like appearance and texture. The properties of the product are given in Table 2, together with those of a sheet-like material obtained as a control in the same manner from a coating solution of the same composition as above except that it was devoid of the cetyl alcohol.

TABLE 2

| Test specimen | Weight (g./m.²) | Thickness (mm.) | Specific gravity | Gas permeability (time) | Moisture permeability (g./m.²/24 hrs.) |
| --- | --- | --- | --- | --- | --- |
| Of invention | 775 | 1.52 | 0.51 | 80 sec | 2,600 |
| Control | 760 | 1.46 | 0.52 | Over 2 hrs | 400 |
| Bull leather (instep) | 871 | 1.32 | 0.66 | 150 sec | 3,380 |

What we claim is:

1. The method of producing gas-permeable films and coatings which comprises forming a polyurethane elastomer by reacting a polyglycol of a mean molecular weight of about 500–5000 selected from the group consisting of polyester glycol, polyether glycol, polyether ester glycol and mixtures thereof, an organic diisocyanate, and a polyfunctional chain extender selected from the group consisting of diamines and diols; said polyglycol, diisocyanate and extender being combined in a proportion such that the combined number of OH groups of said polyglycol and said extender are approximately the same as the number of NCO groups of said diisocyanate; dissolving said polyurethane elastomer in a solvent to form a solution; adding an alkyl alcohol having from 8 to 30 carbon atoms to said solution in an amount from 0.1 to 20% based upon the weight of said polyurethane elastomer; coating said solution onto a flat substrate; wet coagulating said resultant coating with a liquid which is a non-solvent for said polyurethane elastomer and is miscible with said solvent; washing with water to remove the solvent; and drying.

2. The method of claim 1, wherein said alkyl alcohol is selected from the group consisting of tetradecyl alcohol, cetyl alcohol, stearyl alcohol, ceryl alcohol, myricyl alcohol and mixtures thereof.

3. The method of claim 1, wherein the flat substrate is an unwoven cloth which is impregnated with the polyurethane elastomeric solution.

4. The method of claim 1, wherein said polyglycol is a polyester glycol.

5. The method of claim 1, wherein said bifunctional chain extender is a glycol.

6. The method of claim 1, wherein said solvent is dimethylformamide.

7. The method of claim 1, wehrein said liquid is a mixture of dimethyl formamide and water.

References Cited

UNITED STATES PATENTS

| | | | |
|---|---|---|---|
| 2,970,123 | 1/1961 | Rhodes | 260—75 |
| 3,000,757 | 9/1961 | Johnston | 260—77.5 |
| 3,100,721 | 8/1963 | Holden | 260—77.5 |

WILLIAM D. MARTIN, *Primary Examiner.*

DONALD E. CZAJA, *Examiner.*

M. C. JACOBS, T. G. DAVIS, *Assistant Examiners.*